(12) United States Patent
Klemm

(10) Patent No.: US 12,190,188 B2
(45) Date of Patent: Jan. 7, 2025

(54) PRELAM BODY OF A SMART CARD, METHOD OF FORMING A PRELAM BODY OF A SMART CARD, AND A SMART CARD

(71) Applicant: LINXENS HOLDING, Mantes la Jolie (FR)

(72) Inventor: Lars Klemm, Dresden (DE)

(73) Assignee: LINXENS HOLDING, Mantes la Jolie (FR)

( * ) Notice: Subject to any disclaimer, the term of this patent is extended or adjusted under 35 U.S.C. 154(b) by 0 days.

(21) Appl. No.: 18/025,837

(22) PCT Filed: Sep. 25, 2020

(86) PCT No.: PCT/IB2020/000793
§ 371 (c)(1),
(2) Date: Mar. 10, 2023

(87) PCT Pub. No.: WO2022/064233
PCT Pub. Date: Mar. 31, 2022

(65) Prior Publication Data
US 2023/0359856 A1    Nov. 9, 2023

(51) Int. Cl.
*G06K 19/077*    (2006.01)
(52) U.S. Cl.
CPC .  *G06K 19/07745* (2013.01); *G06K 19/07722* (2013.01); *G06K 19/07783* (2013.01)
(58) Field of Classification Search
CPC ... H01L 2924/14; H01L 24/13; H01L 21/563; H01L 2224/05558; G06K 19/07722;
(Continued)

(56) References Cited

U.S. PATENT DOCUMENTS

| | | | |
|---|---|---|---|
| 8,881,373 B1 * | 11/2014 | Koepp | H01Q 23/00 |
| | | | 29/592.1 |
| 2011/0242772 A1 | 10/2011 | Singleton | |
| 2013/0270705 A1 * | 10/2013 | Wang | H01L 23/49827 |
| | | | 257/773 |

FOREIGN PATENT DOCUMENTS

| | | | | |
|---|---|---|---|---|
| CN | 107085740 A | | 8/2017 | |
| EP | 1316998 A2 * | | 6/2003 | H01H 37/761 |

(Continued)

OTHER PUBLICATIONS

Wufeng, "Flip Chip Method In Smart CardISmart Label Packaging" (Year: 2003).*

(Continued)

*Primary Examiner* — Thien T Mai
(74) *Attorney, Agent, or Firm* — DITTHAVONG, STEINER & MLOTKOWSKI

(57) ABSTRACT

The present disclosure provides in various aspects for a prelam body of a smart card, a method of forming a prelam body of a smart card, and a smart card having a card body with such a prelam body. According to some embodiments herein, a prelam body of a smart card comprises a prelam body substrate having an IC landing area provided on a first main surface of the prelam body substrate, the IC landing area having at least one contact pad and at least one dummy island, wherein the at least one contact pad is electrically coupled with at least one conductive line routed in or on the prelam body substrate, and a chip having at least one contact element arranged on a second main surface of the chip, wherein the at least one contact element is in electric connection with the at least one contact pad. The chip is flip-chip bonded to the prelam body substrate such that the first main surface and the second main surface face each other and that the chip at least partially overlies the at least one contact pad. Herein, the at least one dummy island and (Continued)

the at least one contact pad each represent a support for the chip on the prelam body substrate.

22 Claims, 3 Drawing Sheets

(58) Field of Classification Search
CPC ....... G06K 19/07745; G06K 19/07783; G06K 19/077; H05K 2201/10674
See application file for complete search history.

(56) References Cited

FOREIGN PATENT DOCUMENTS

| EP | 2149858 A1 | 2/2010 |
|---|---|---|
| FR | 3086099 A1 | 3/2020 |
| WO | WO-1999019832 A * | 4/1999 |

OTHER PUBLICATIONS

Kleeman, "Lower cost smart ID cards" (Year: 2008).*
International Search Report and Written Opinion for related International Application No. PCT/IB2020/000793, dated Jun. 14, 2021, 9 pages.

* cited by examiner

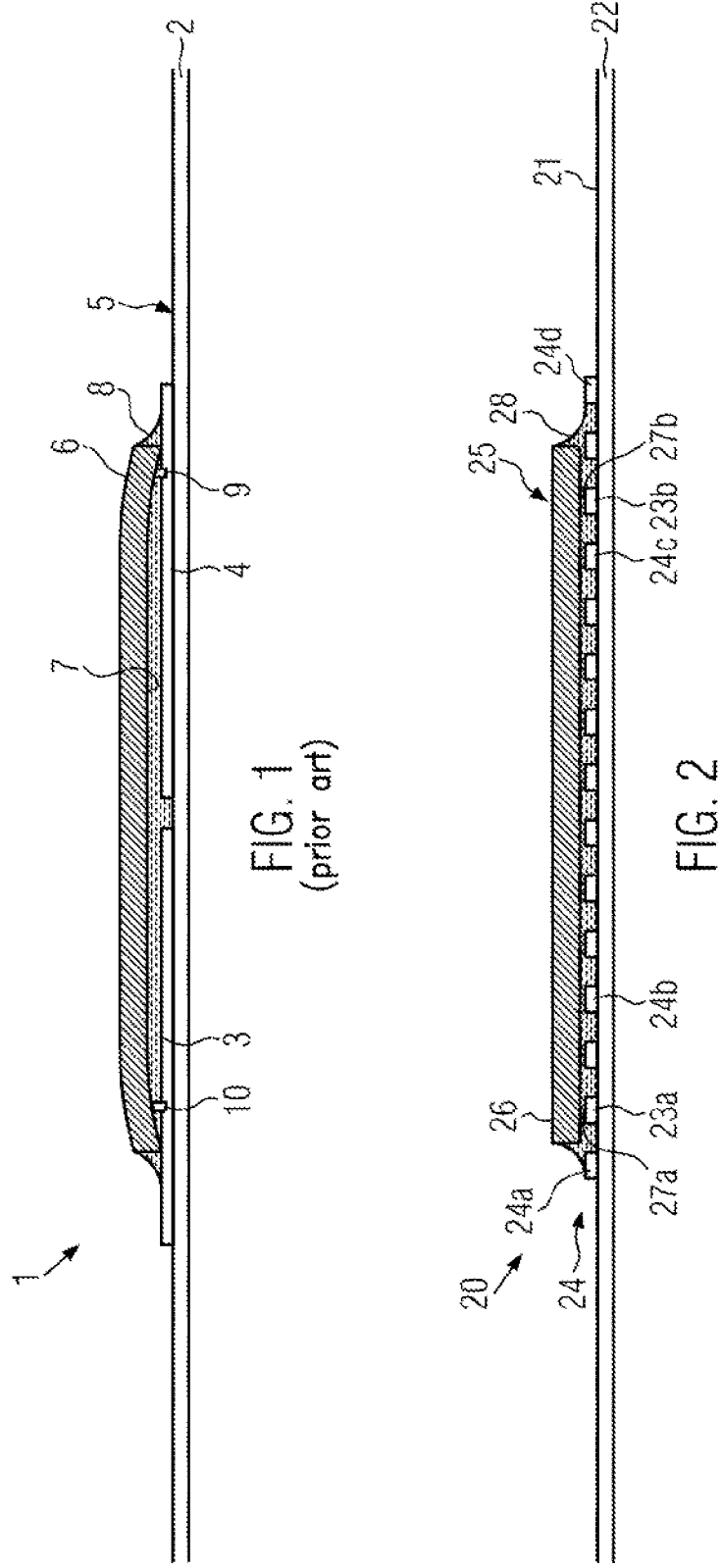

PRELAM BODY OF A SMART CARD, METHOD OF FORMING A PRELAM BODY OF A SMART CARD, AND A SMART CARD

FIELD OF THE INVENTION

The present invention relates to a prelam body of a smart card, a method of forming a prelam body of a smart card, and a smart card having a card body with such a prelam body.

BACKGROUND

In general, a smart card is part of a complex system, wherein the smart card interacts with other entities of the complex system via one or more interfaces depending on an intended application of the smart card. The characteristic feature of a smart card is an integrated circuit embedded into the smart card for transmitting, storing and processing data. For example, conventional smart cards may be equipped with a memory and/or a processor and/or an antenna. Furthermore, smart cards may be of the contact-type, the contactless-type or of the hybrid type.

Since a smart card is the only component that a user commonly has in hands, there is an ongoing task of developing multifunctional cards that unite functions associated to various types of applications, into a single smart card. Several standards have been developed for smart cards of contact-type, contactless type or hybrid type. These standards specify stringent requirements on the structure and performance of a smart card and its components. In particular, the relevant ISO/IEC standards are especially significant for smart cards because these standards are based on a broad international consensus and define the fundamental properties of smart cards such that smart cards are compatible with a great number of card terminals in all over the world. Therefore, the relevant ISO/IEC standards are to be strictly observed in any smart card fabrication process in order to ensure that fabricated smart cards comply with the relevant ISO/IEC standards. The person skilled in the art is thus assumed to be aware of the relevant ISO/IEC standards and to take them into account when developing smart cards.

In particular, smart cards are the youngest member of the family of identification cards using the ID-1 format defined in ISO/IEC Standard 7810, "Identification Cards—Physical Characteristics." This standard specifies the physical properties of identification cards, including their material properties such as flexibility and temperature resistance, as well as the dimensions of three different card formats: ID-1, ID-2 and ID-3. The ISO 7816-I family of smart card standards is based on the ID-1 card format, commonly used for the payment cards used by millions of people. Other formats are also established in some applications, particularly, applications in which magnetic-stripe cards are not necessary, such as SIM cards in the so-called ID-000 format, for example.

Current smart cards usually have dimensions similar to those of a credit card. A typical size of smart cards is given by ID-1 of the ISO/IEC 7810 standard which defines cards having nominally 85.60 mm by 53.98 mm (3.37 in×2.13 in). Another popular size is ID-000, which is nominally 25 mm by 15 mm (0.98 in×0.59 in) and which is commonly used in SIM cards. In each case, a thickness is given by about 0.76 mm (0.030 in). Accordingly, the size of the smart card is to be considered as standardized and will therefore not change despite of an increasing number of features to be integrated into the smart card. Consequently, the sizes of interconnections have to be scaled when increasing the number of contacts and interconnections so as to allow an integration of an increased number of contacts and interconnections into the card body. It becomes an issue to provide a high quality of electrical interconnections among integrated features and integrated circuits in a card body and to ensure a reliably interconnection over a long lifetime of a smart card.

Regarding the expression "prelam body" as used herein, it is understood as representing a prelaminated body with multiple layers of an insulating material, such as PVC, pre-laminated together. This prelaminated body represents an intermediate product obtained during fabrication of a smart card. For example, an illustrative prelam body may be obtained by fusing together different layers of a thermoplastic material into a single homogeneous sheet body, thereby embedding a substrate with at least one contact and/or interconnection into the prelam body. For example, a "prelam body" may be considered as a monolithic structure obtained during the fabrication of a smart card, which structure possibly has a wiring structure formed within its physical body. It is to be noted that an integration of an entirety of electronic modules is only completed in subsequent stages during fabrication of a smart card.

Regarding the expression "body of a smart card", this expression as referred to in this description, means a physical body of a smart card. For example, depending on the stage during fabrication of a smart card, the body of a smart card at a given stage during fabrication represents the physical body of the smart card at the given stage during fabrication, which only comprises physical elements, which physically constitute the smart card at the given stage during fabrication. In another example, a body of a finalized smart card may be understood as comprising the prelam body and at least one feature module integrated therein.

Regarding the expression "card body", this expression means a prelam body having a top and/or bottom layer and one or more optional compensation layers mounted thereto. In particular, the card body may represent the body of a smart card in the fabrication of a smart card at stages after preparation of a prelam body and prior to completing an integration of an entirety of electronic modules into the body of the smart card. In other words, a card body may represent a body of a smart card at a stage of fabrication at which the geometric dimensions of the body comply with the geometric dimensions defined in accordance with ISO standards for a smart card prior to an entirety of electronic modules, which are to be incorporated into a smart card, being completely integrated into the card body.

A "smart card" is considered as representing a final product obtained after completing an integration of an entirety of electronic modules, which are to be incorporated into a smart card.

With regard to FIG. 1, a conventional prelam body of a conventional smart card is schematically shown in a cross-sectional view. At the stage during fabrication as illustrated in FIG. 1, the prelam body 1 has a prelam body substrate 2 equipped with two IC landing elements 3, 4 provided in IC landing areas of a main surface 5 of the prelam body substrate 2. A chip 6 is mounted to the prelam body substrate 2 in accordance with flip-chip technique such that a main surface 7 of the chip 6 having contact pillars 9, 10 provided therein, is faced towards the main surface 5 of the prelam body substrate 2. A space between the chip 6 and the prelam body substrate 2 is filled with an adhesive material 8.

The IC landing elements 3, 4 are provided as large area contact pads on the main surface 5 of the prelam body substrate 2 for reliably contacting the contact pillars 9, 10 of the chip 6 during flip-chip bonding. However, the adhesive material 8 (which is pre-deposited prior to mounting the chip 6 to the prelam body substrate 2) has a given thickness which leads to a bending of the chip 6 because too much of the adhesive material 8 accumulates between the chip 6 and the contact pads 3, 4 of the prelam body substrate 2. The resulting uneven distribution of the adhesive material 8 between the chip 6 and the prelam body substrate 2 poses the risk of causing problems during the curing of the adhesive material 8 in subsequent processing steps. For example, it is possible that undesired stress is imposed onto the chip 6. Even when attempting to squeeze out the adhesive material 8 from below the chip 6 over the prelam body substrate 2, it is not feasible to obtain a planar chip module and an even distribution of the adhesive material 8 between the chip 6 and the prelam body substrate 2. When attempting to reduce the thickness of the accumulated adhesive material 8 by depositing less adhesive material 8 in the IC landing area over the prelam body substrate 2, a degraded bonding force between the chip 6 and the prelam body substrate 2 is obtained.

In view of the above-described situation, it is an object to provide a prelam body of a smart card having an even distribution of adhesive material between a chip of the smart card and the prelam body substrate, thereby allowing an improved bonding between the chip and the prelam body substrate without the risk of the chip being exposed to undesired mechanical stress and/or damaging fabrication processes during flip-chip bonding.

BRIEF SUMMARY

The above problems and objects are solved in the various aspects of the present disclosure, where some aspects relate to a prelam body of a smart card, some aspects relate to-a method of forming a prelam body of a smart card, and some aspects relate to a smart card in accordance with the claims herein.

In a first aspect of the present disclosure, a prelam body of a smart card is provided. In accordance with illustrative embodiments herein, the prelam body comprises a prelam body substrate having an IC landing area provided on a first main surface of the prelam body substrate, the IC landing area having at least one contact pad and at least one dummy island, wherein the at least one contact pad is electrically coupled with at least one conductive line routed in or on the prelam body substrate, and a chip having at least one contact element arranged on a second main surface of the chip, wherein the at least one contact element is in electric connection with the at least one contact pad. The chip is flip-chip bonded to the prelam body substrate such that the first main surface and the second main surface face each other and that the chip at least partially overlies the at least one contact pad. Herein, the at least one dummy island and the at least one contact pad each represent a support for the chip on the prelam body substrate. By means of the at least one dummy island, it is possible to more evenly distribute an adhesive material during flip-chip bonding, thereby avoiding an accumulation of the adhesive material under the chip. The dummy island(s) and the contact pad(s) allow to lead out any excess adhesive material due to spacing between island(s) and contact pad(s). Furthermore, a bonding force between the chip and the prelam body substrate is increased due to an increased surface provided by the dummy island(s) and contact pad(s) with spacing.

In a second aspect of the present disclosure, a method of forming a prelam body of a smart card is provided. In accordance with some illustrative embodiments herein, the method comprises preparing a prelam body substrate, providing an IC landing area in or on a first main surface of the prelam body substrate, wherein at least one contact pad and at least one dummy island are formed in or on the first main surface, wherein the at least one contact pad is electrically coupled with at least one conductive line routed in or on the prelam body substrate. The method further comprises preparing a chip having at least one contact element arranged on a second main surface of the chip, and flip-chip bonding the chip to the prelam body substrate so as to bring the at least one contact element into electric connection with the at least one contact pad. The first main surface and the second main surface face each other. The chip at least partially overlies the at least one dummy island and the at least one contact pad. By means of the at least one dummy island, it is possible to more evenly distribute an adhesive material applied during flip-chip bonding, thereby avoiding an accumulation of the adhesive material under the chip. The dummy island(s) and the contact pad(s) allow to lead out any excess adhesive material due to spacing between island(s) and contact pad(s). Furthermore, a bonding force between the chip and the prelam body substrate is increased due to an increased surface provided by the dummy island(s) and contact pad(s) with spacing.

In accordance with some illustrative embodiments of the first aspect and/or second aspect, a plurality of dummy islands may be arranged in the IC landing area in an arrangement pattern adjacent the at least one contact pad, wherein the chip at least partially overlies at least some of the dummy islands. The provision of a plurality of dummy islands arranged in the arrangement pattern adjacent the at least one contact pad advantageously affects the bonding force and leads to a more even distribution of an adhesive material applied during the bonding process. The chip at least partially overlaying the dummy island(s) ensures that the chip has sufficient support on the prelam body substrate.

In accordance with some illustrative examples of these illustrative embodiments, the arrangement pattern may have a polygonal boundary. Accordingly, the arrangement pattern may be easily provided in a repetitive manner and may easily adapt the arrangement pattern easily to different chip sizes.

In accordance with some illustrative examples of these illustrative embodiments, at least some of the plurality of dummy islands may be formed in a columnar shape extending to a height level over the first main surface substantially common to a height level over the first main surface to which the at least one contact pad extends. Accordingly, the dummy islands may be easily fabricated when preparing the prelam body.

In accordance with some illustrative examples of these illustrative embodiments, at least some of the plurality of dummy islands may be formed in a fin shape extending to a height level over the first main surface substantially common to a height level over the first main surface to which the at least one contact pad extends. The fin-shaped dummy islands are less prone to mechanical damage and provide an improved support for the chip on the prelam body substrate.

In accordance with some illustrative examples of these illustrative embodiments, the arrangement pattern may be a regular grid-like pattern of dummy islands in the IC landing area. Hereby, a regular grid-like pattern of dummy patterns may be easily fabricated in a repetitive manner and also allows to provide a well-defined bonding force between the chip and the prelam body substrate.

In accordance with some illustrative embodiments of the first aspect and/or second aspect, the at least one contact pad and the at least one conductive line may be arranged in and/or on the prelam body substrate so as to laterally enclose the at least one dummy island in the IC landing area.

In accordance with some illustrative embodiments of the first aspect, an adhesive material may be sandwiched between the chip and the prelam body substrate, wherein the adhesive material may be an anisotropic conductive film (ACF) or an anisotropic conductive paste (ACP) or a non-conductive paste (NCP), for example.

In accordance with some illustrative embodiments of the second aspect, an adhesive material may be provided between the chip and the prelam body substrate during the flip-chip bonding, wherein the adhesive material may be an anisotropic conductive film (ACF) or an anisotropic conductive paste (ACP) or a non-conductive paste (NCP), for example In accordance with some illustrative embodiments of the first aspect and/or second aspect, the at least one dummy island may be formed of an electrically conductive material. Accordingly, the dummy island may have advantageous mechanical properties and may be formed in accordance with techniques used for fabricating the contact pad(s).

In accordance with some illustrative embodiments of the first aspect and/or second aspect, the at least one dummy island may be formed on a layer of insulating material on the first main side. Accordingly, the risk of short circuits (which appear when accidentally contacting the contact element of the chip with the at least one dummy island) may be avoided.

In a third aspect of the present disclosure, a smart card is provided. In accordance with some illustrative embodiments of the third aspect, the smart card comprises a card body having the prelam body of the first aspect and an electric module integrated into the card body, wherein the electric module is electrically coupled to the at least one contact pad. For example, the electric module may be an antenna coil.

In accordance with some special illustrative, but non-limiting examples of the various aspects of the present disclosure, a chip may be understood as representing a bare die, or a die in packaged form or in at least partially encapsulated form.

BRIEF DESCRIPTION OF THE DRAWINGS

Further aspects and illustrative embodiments of the present disclosure will be described in greater detail in connection with the accompanying drawings in the detailed description below, wherein the drawings are not to scale.

FIG. 1 schematically shows, in a cross-sectional view, a conventional prelam body.

FIG. 2 schematically shows, in a cross-sectional view, a prelam body in accordance with some illustrative embodiments of the present disclosure.

DETAILED DESCRIPTION

Figure 3:
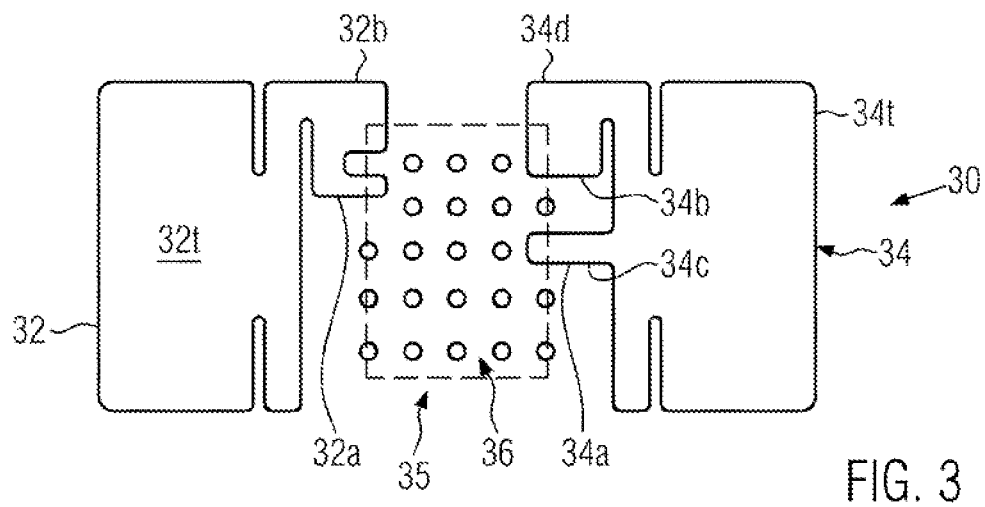
FIG. 3 schematically shows, in a top view, an IC landing area in accordance with some illustrative embodiments of the present disclosure.

With regard to FIG. 2, a prelam body 20 in accordance with some illustrative embodiments of the present disclosure will be described. The prelam body 20 is a prelam body of a smart card under fabrication and comprises a prelam body substrate 22 having an IC landing area provided on a first main surface 21 of the prelam body substrate 22. As used herein, the IC landing area represents a surface portion of the first main surface 21 in which at least one contact pad and at least one dummy island are formed.

In accordance with some illustrative embodiments of the present disclosure, the prelam body 20 further comprises a plurality of contact pads. Referring to FIG. 2, the plurality of contact pads is provided by a contact pad 23a and a contact pad 23b, which are both formed in the first main surface 21. The prelam body 20 further comprises a plurality of dummy islands formed in the first main surface 21. According to FIG. 2 and for illustrative purposes, some dummy islands of the plurality of dummy islands are denoted by reference numerals in the illustration of FIG. 2, such as dummy islands 24a, 24b, 24c and 24d.

In the illustrative embodiments depicted with regard to FIG. 2, the dummy islands 24b and 24c may be laterally enclosed by the contact pads 23a and 23b with regard to at least one direction, preferably the direction being given by a short as possible line drawn between the contact pads 23 and 23b. As used herein, the expression "dummy islands are laterally enclosed by contact pads" means that contact pads are arranged at two or more sides of dummy islands.

In accordance with some illustrative embodiments of the present disclosure, the contact pads 23a and 23b may be provided by an electrically conductive material, which is deposited and patterned on the first main surface 21 of the prelam body substrate 22. The contact pads may be electrically coupled with at least one conductive line (not illustrated) which may be provided as a wiring structure within the prelam body substrate 22, or by means of conductive lines provided on the first main surface 21. For example, the conductive pads 23a and 23b together with conductive lines (not illustrated), may be provided by aluminum or copper.

In accordance with some illustrative embodiments of the present disclosure and, as illustrated in FIG. 2, one or more dummy islands may be provided in an arrangement so as to laterally enclose the contact pads 23a and 23b. For example, the contact pad 23a is laterally enclosed by the dummy islands 24a and 24b. For example, the contact pad 23b may be laterally enclosed by dummy islands 24c and 24d. However, this does not pose any limitation on the present disclosure and at least one of the contact pads 23a and 23b may not be laterally enclosed by dummy islands. As used herein, the expression "contact pads are laterally enclosed by dummy islands" means that dummy islands are arranged at two or more sides of contact pads.

In accordance with some illustrative embodiments of the present disclosure, the dummy islands 24 may be formed of an electrically conductive material, e.g., the same material as the material of which the contact pads 23a and 23b are formed. This does not pose any limitation on the present disclosure and the person skilled in the art will appreciate that the dummy islands 24 may be formed of an insulating material.

According to some illustrative examples, the dummy islands 24 may be made of a conductive material and an uppermost layer (not illustrated) of the prelam body substrate 22 (i.e., the material at the first main surface 21 of the prelam body substrate 22) may be made of an electrically insulating material. In these illustrative examples, the dummy islands 24 may be electrically floating, particularly not connected to any conductive line or pad present in the prelam body substrate 22.

According to some alternative examples, at least some of the dummy islands may be electrically connected with each other such that a tolerance with respect to a possible misalignment of the contact pads may be compensated by one or more dummy islands. In case that the dummy islands are electrically isolated from any pad and conductive line present in the prelam body substrate, the dummy islands may reduce the risk of accidental short circuits caused by misaligned bonding of a chip to the prelam body substrate in the IC landing area.

In accordance with some illustrative embodiments of the present disclosure, the contact pads 23a, 23b and the dummy islands 24 may extend substantially to a common height level with regard to the first main surface 21 of the prelam body substrate 22. The term "substantially" may indicate an acceptable tolerance in deviations from the common height.

With continued reference to FIG. 2, a chip 25 having contact elements 27a and 27b arranged on a second main surface 26 of the chip 25 is flip-chip bonded to the prelam body substrate 22 in that the first main surface 21 and the second main surface 26 face each other. Due to the flip-chip bonding, the contact elements 27a and 27b are brought into contact with the contact pads 23a and 23b of the prelam body substrate 22. When bonding the chip 25 to the prelam body substrate 22, the chip 25 is arranged over the contact pads 23a and 23b and the dummy islands 24 such that the chip 25 at least partially overlies the dummy islands 24 and the contact pads 23a, 23b. This does not pose any limitation on the present disclosure in that any dummy island is at least partially overlaid by the chip 25, thereby not excluding that the dummy islands 24a and 24b in FIG. 2 are not covered by the chip 25 in the prelam body 20 of FIG. 2.

In accordance with some illustrative embodiments, an adhesive material 28 may be sandwiched between the chip 25 and the prelam body substrate 22. For example, the adhesive material may be an anisotropic conductive film (ACF) or an anisotropic conductive paste (ACP) or a non-conductive paste (NCP) or any resin which is commonly used in flip-chip techniques. Due to the dummy islands 24 provided adjacent the contact pads 23a, 23b, e.g., between the contact pads 23a, 23b along a connecting direction between the contact pads 23a and 23b, the adhesive material 28 may evenly distribute between the prelam body substrate 22 and the chip 25. Accordingly, a substantially planar configuration of the chip 25 in the prelam body 20 of FIG. 2 is achieved. Furthermore, the dummy islands 24 increase a surface of the prelam body substrate 22, thereby increasing a bonding force in the flip-chip bonding between the chip 25 and the prelam body substrate 22.

With ongoing reference to FIG. 2, the dummy islands 24 may be arranged in an arrangement pattern such that, at least in a connecting direction between the contact pads 23a and 23b, the dummy islands 24 are equidistantly arranged with respect to each other and the contact pads 23a, 23b. However, this does not pose any limitation to the present disclosure and a varying spacing between two adjacent dummy islands may be present.

In accordance with some illustrative embodiments, the prelam body 20 of FIG. 2 may be formed by preparing the prelam body substrate 22, e.g., as a pre-laminated substrate body, possibly cut into an appropriate size of a smart card, providing an IC landing area on the first main surface 21 of the prelam body substrate 22, wherein at least one contact pad 23a, 23b and at least one dummy island 24 are formed in the first main surface 21. The at least one contact pad 23a, 23b is electrically coupled with at least one conductive line (not illustrated) routed in the IC landing area. Furthermore, the chip 25 is prepared with at least one contact element 27a, 27b arranged on the second main surface 26 of the chip 25. Then, a flip-chip bonding of the chip 25 to the prelam body substrate 22 is performed so as to bring the at least one contact element 27a, 27b into electric connection with the at least one contact pad 23a, 23b. The first main surface 21 and the second main surface 26 face each other in the flip-chip bonding of the chip 25 to the prelam body substrate 22. The chip 25 at least partially overlies the at least one dummy island 24 and the at least one contact pad 23a, 23b.

Although FIG. 2 schematically illustrates a plurality of contact pads 23a, 23b and a plurality of dummy islands 24, this does not pose any limitation on the present disclosure and one of the contact pads 23a, 23b and one of the dummy islands 24 may be provided instead.

Referring to FIG. 3, a top view of an IC landing area 30 of a prelam body substrate (not illustrated) is schematically shown. The IC landing area 30 comprises a contact pattern 32 and a contact pattern 34. The contact pattern 32 comprises a contact pad 32a, while the contact pattern 34 comprises a contact pad 34a and a contact pad 34b. In general, each of the contact patterns 32, 34 may have an arbitrary number of contact pads, although only one contact pad is shown for the contact pattern 32 and two contact pads are shown for the contact pattern 34.

Although only two contact patterns 32, 34 are shown, an arbitrary number of contact patterns may be provided, e.g., a single contact pattern or more than two contact patterns.

In accordance with some illustrative embodiments, one contact pattern of the contact patterns 32, 34 may be used to connect to a contact element of a chip (indicated in FIG. 3 by a box 35 with broken lines) and to make a connection to a different electric and/or electronic module (not illustrated) or chip. For example, the contact patterns 32, 34 may be electrically coupled with terminals of an antenna coil for coupling the chip 35 to an antenna coil (not illustrated).

As shown in FIG. 3, a plurality of dummy islands 36 is formed between the contact patterns 32, 34 such that the plurality of dummy islands 36 is laterally enclosed by the contact patterns 32, 34. Accordingly, the plurality of dummy islands 36 is considered as being laterally enclosed by the contact pads 32a, 34a and 34b.

According to the illustration in FIG. 3, the contact pad 32a is connected in the contact pattern 32 by a conductive line 32b. For example, a terminal pad 32t may be coupled to the contact pad 32a by means of the conductive line 32b. Similarly, the contact pad 34a may be coupled to a terminal pad 34t of the contact pattern 34 via a conductive line 34c, while the contact pad 34b is electrically coupled to the terminal pad 34t via a conductive line 34d. The number of conductive lines does not pose any limitation on the present disclosure and the person skilled in the art will appreciate that a contact pad may be coupled to a terminal pad by an arbitrary number of contact pads and conductive lines connected in series and/or parallel.

In accordance with some illustrative embodiments and as illustrated in FIG. 3 of the present disclosure, the plurality of dummy islands 36 may be arranged in an arrangement pattern according to a regular, grid-like pattern of dummy islands. This means that the plurality of dummy islands 36 may be arranged in a regular matrix-like pattern such that adjacent dummy islands in two orthogonal directions are arranged with same distance from each other. The arrangement of the plurality of dummy islands 36 shown in FIG. 3 may have a boundary in the form of a rectangle. For example, the plurality of dummy islands 36 may be arranged in M rows of N dummy islands within each row. The numbers M and N are natural numbers, each being greater than 0. For example, in case of M=N=1, a single dummy island may be present instead of the plurality of dummy islands 36 illustrated in FIG. 3. This single dummy island may be arranged so as to coincide with a center of gravity of the chip 35 in the top view of FIG. 3. Alternatively, the single dummy island may coincide in the top view of FIG. 3 with a center of a line drawn between a contact pad of the contact pattern 32 and a contact pad of the contact pattern 34.

In the illustration of FIG. 3, the dummy islands are provided in columnar shape with a round surface. This does not pose any limitation on the present disclosure and dummy islands of columnar shape with irregular form in the top view of FIG. 3 may be chosen instead.

Figure 4:
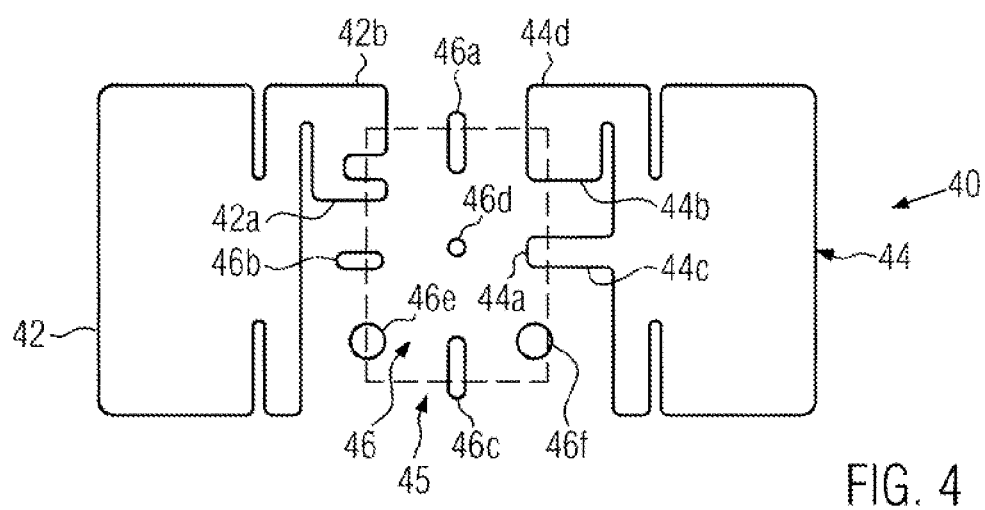
FIG. 4 schematically shows, in a top view, an IC landing area in accordance with some other illustrative embodiments of the present disclosure.

Referring to FIG. 4, a top view on an IC landing area 40 in accordance with some other illustrative embodiments of the present disclosure is schematically illustrated. The IC landing area 40 has contact patterns 42 and 44 which correspond to contact patterns 32 and 34 in FIG. 3. This does not pose any limitation on the present disclosure and the contact patterns 42 and 44 may have a different geometrical shape in the top view of FIG. 4. Accordingly, the description of the contact patterns 32 and 34 as presented in the context of FIG. 3 above applies straightforward to the contact patterns 42 and 44, particularly contact pads 42a, 44a, 44b and conductive lines 42b, 44c, 44d. A chip is indicated in the top view of FIG. 4 by a box 45 with broken lines.

FIG. 4 shows a plurality of dummy islands 46, the plurality of dummy islands 46 comprising fin-shaped dummy islands 46a, 46b and 46c, as well as columnar-shaped dummy islands 46d, 46e and 46f. Accordingly, the plurality of dummy islands 46 may comprise two sets of dummy islands, the fin-shaped dummy islands 46a and 46b, and the columnar-shaped dummy islands 46d, 46e and 46f. As indicated in the schematic top view of FIG. 4, the dummy islands within each set of dummy islands, may have different sizes. For example, the fins 46a and 46c may have a greater length dimension (measured along a length direction representing a longest dimension in the top view of FIG. 4) as compared to the fin-shaped dummy island 46b. Furthermore, the fin-shaped dummy islands 46a, 46c may be arranged with their length direction in parallel to each other, while being orthogonal to a length direction of the fin-shaped dummy island 46b.

As illustrated in FIG. 4, a diameter of the columnar-shaped dummy islands 46d, 46e and 46f may be different. For example, the dummy island 46d may have a smaller diameter when compared to each of the dummy islands 46b and 46f, and the dummy island 46d arranged at or close to a location point close to or at the center of gravity of the chip 45 in the top view of FIG. 4, may have a smaller diameter when compared to dummy islands 46e and 46f. The dummy islands are farther spaced apart from the center of gravity of the chip 45 when compared to a spacing of the dummy island 46d relative to the center of gravity of the chip 45. Accordingly, a stable support of the chip 45 on the dummy islands 46 may be achieved. Furthermore, the spacing between the various dummy islands allows an adhesive material (not illustrated) to more evenly distribute in the space between the dummy islands 46.

Figure 5:
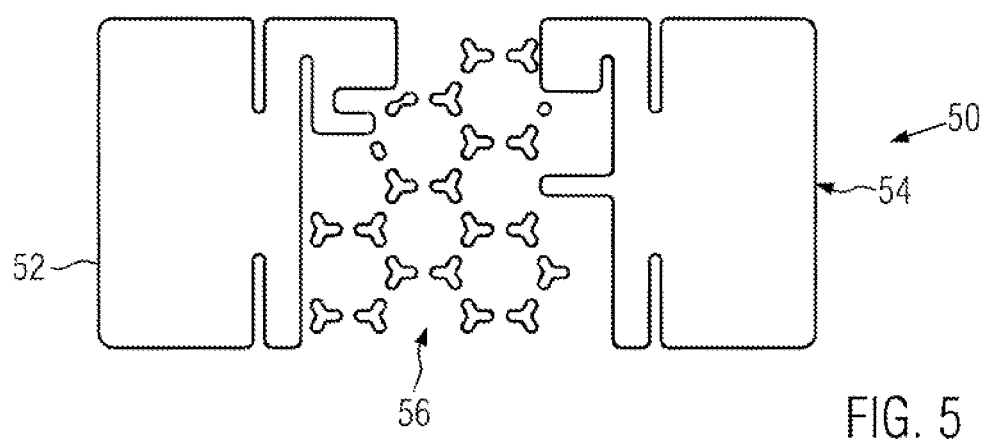
FIG. 5 schematically shows, in a top view, an IC landing area in accordance with some other illustrative embodiments of the present disclosure.

Referring to FIG. 5, a top view on an IC landing area 50 in accordance with some other illustrative embodiments of the present disclosure is schematically illustrated. The IC landing area 50 has two contact patterns 52 and 54 which substantially correspond to the contact patterns 42, 44 and 32, 34 as described above with regard to FIGS. 3 and 4. Accordingly, the description of the contact patterns 32, 34 and 42, 44 above is incorporated by reference at this point.

FIG. 5 schematically illustrates a plurality of dummy islands 56 arranged in between the contact patterns 52, 54. The dummy islands of the plurality of dummy islands 56 are of a substantially columnar shape, however deviating in their form in the top view of FIG. 5 from a cylindrical columnar shape, but implementing a general form of columnar shapes. Furthermore, the plurality of dummy islands 56 is arranged in an arrangement pattern composed of regular polygonal figures, e.g., hexagonal sub-arrangements of the dummy islands 56 similar to a honeycomb.

Figure 6:
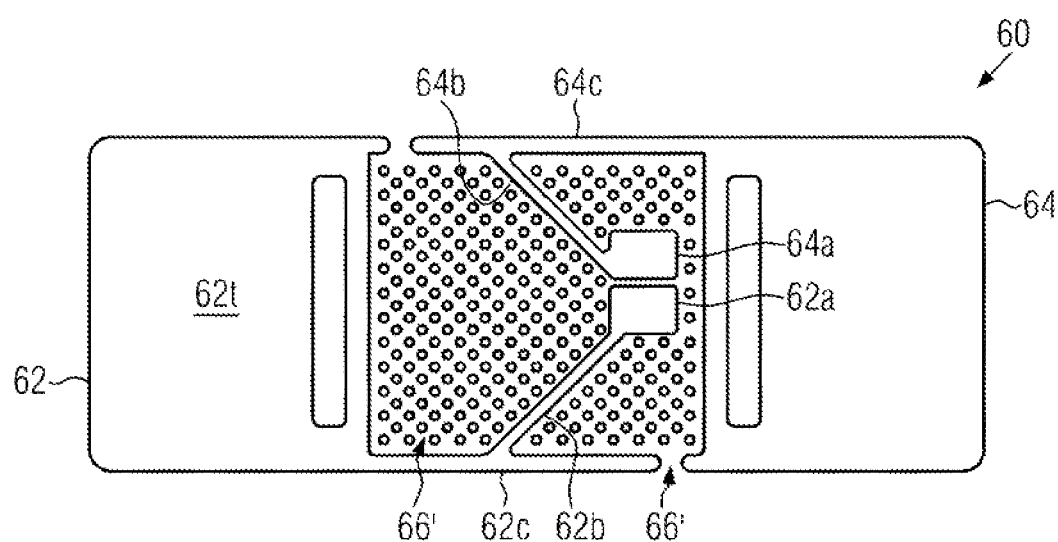
FIG. 6 schematically shows, in a top view, an IC landing area in accordance with some other illustrative embodiments of the present disclosure.

Referring to FIG. 6, an IC landing area 60 in accordance with some other illustrative embodiments is schematically shown in a top view. The IC landing area 60 of FIG. 6 has two contact patterns 62 and 64 of an alternative shape with respect to the embodiments illustrated in FIGS. 3 to 5.

According to the illustration in FIG. 6, the contact pattern 62 has a terminal pad 62t which is connected with a contact pad 62a by means of two conductive lines 62b and 62c. Similarly, the contact pattern 64 may have a terminal pad 64t which is connected with a contact pad 64a by means of two conductive lines 64b and 64c. The conductive lines 64b, 64c, 62b, 62c laterally enclose a plurality of dummy islands which are separated into two sets 66' and 66" by the conductive lines 62b and 64b separating the two sets 66' and 66". Within each set of the set 66' and 66", dummy islands are arranged in a regular grid pattern and a boundary of each of the sets 66' and 66" is of a polygonal shape. The polygonal shape may be provided by the conductive lines and the contact pads of each of the contact patterns. This does not pose any limitation on the present disclosure and the dummy islands shown in FIG. 6 may be replaced by the dummy islands shown in FIG. 4 or as shown in FIG. 5.

A chip (not illustrated) may be placed in the context of FIG. 6 such that the chip (not illustrated) is aligned with the space between the terminal pads 62t and 64t, possibly partially overlapping the terminal pads 62t and 64t.

In the context of the above-described embodiments and in the context of any of FIGS. 1 to 6, a chip may generally have a size of at least 1×1 mm$^2$, such as at least 2×2 mm$^2$ or at least 3×3 mm$^2$ or at least 4×4 mm$^2$ or at least 5×5 mm$^2$. In special illustrative examples, a chip may have a size of about 1×1 mm$^2$, such about 2×2 mm$^2$ or about 3×3 mm$^2$ or about 4×4 mm$^2$ or about 5×5 mm$^2$ or of each value in between these values.

With regard to the embodiments described above with regard to any of FIGS. 2 to 6, it is proposed to provide a prelam body substrate of a prelam body of a smart card with at least one contact pad and at least one dummy island in an IC landing area for a contact element of a chip such that the IC landing area is divided into at least one dummy island and at least one contact pad. An adhesive material, e.g., an adhesive such as ACF, ACP or NCP or the like, may then fill the space around the dummy islands in the thickness of the dummy islands and contact pads (standard 18/36 μm copper/ 10 or 39 μm aluminum). It is proposed to arrange a plurality of dummy islands in an N-arrangement pattern and/or with different shapes.

In accordance with some illustrative embodiments of the present disclosure, in which dummy islands are electrically isolated from any conductive element in the prelam body substrate, accidental shortcuts between open pads or bumps of chips are avoided. In general, dummy islands may have a shape that deviates from a regular circle or rectangular in top view and may represent any arbitrary etchable shape. The shape and arrangement of dummy islands may be determined so as to allow a stable support of a chip in the IC landing area of a prelam body and to avoid a breaking of the chip and/or dummy islands during further processing in the fabrication of a smart card.

In accordance with at least some of the above-described embodiments, dummy islands allow to set a minimum thickness for an adhesive material in a flip-chip bonding of a chip to a prelam body substrate when fabricating a smart card. Furthermore, the dummy island(s) helps to more evenly distribute the adhesive material between the chip and the prelam body substrate and to let excessive adhesive material to squeeze out during final bonding in the thermal mode of the flip-chip bonding process. Furthermore, isolated dummy islands allow to avoid shortcuts with open pads or bumps provided on a chip.

After a complete lecture of the present disclosure, a person skilled in the art will appreciate that the bonding of a chip to a prelam body substrate is not limiting in the above disclosure. The above described embodiments may be implemented in the flip-chip bonding of a chip to a carrier when forming a chip module. For example, such a chip module may be integrated into a prelam body substrate of a smart card or, in an alternative way of understanding the expression "prelam body", this term may be understood as representing a chip module obtained after flip-chip bonding a chip to a carrier, the chip module being integrated into a card body of smart card in subsequent fabrication of a smart card.

In accordance with some illustrative embodiments, an arrangement of dummy islands between conductive pads may be designed so as to avoid breaking lines. The person skilled in the art will appreciate that the arrangement of dummy islands as explicitly shown in FIGS. 4 to 6 may be changed in view of considerations to optimize a stable support of a bare die on the base substrate in order to avoid portions where the bare die flip-chip bonded to the base substrate is not sensitive against breaking.

The invention claimed is:

1. A prelam body of a smart card, the prelam body comprising:
   a prelam body substrate having an IC landing area provided on a first main surface of the prelam body substrate, the IC landing area having at least one contact pad and at least one dummy island, wherein the at least one contact pad is electrically coupled with at least one conductive line routed in or on the prelam body substrate and the at least one dummy island is electrically isolated from any conductive element in the prelam body substrate; and
   a chip having at least one contact element arranged on a second main surface of the chip, the at least one contact element being in electric connection with the at least one contact pad,
   wherein the chip is flip chip bonded to the prelam body substrate such that the first main surface and the second main surface face each other and that the chip at least partially overlies the at least one contact pad and the at least one dummy island for supporting the chip on the prelam body substrate.

2. The prelam body of claim 1, wherein a plurality of dummy islands is arranged in the IC landing area in an arrangement pattern adjacent the at least one contact pad, and wherein the chip at least partially overlies at least some of the dummy islands.

3. The prelam body of claim 2, wherein the arrangement pattern has a polygonal boundary.

4. The prelam body of claim 2, wherein at least some of the plurality of dummy islands are formed in a columnar shape extending to a height level over the first main surface substantially common to a height level of the at least one contact pad.

5. The prelam body of claim 2, wherein at least some of the plurality of dummy islands are formed in a fin shape extending to a height level over the first main surface substantially common to a height level of the at least one contact pad.

6. The prelam body of claim 2, wherein the arrangement pattern is a grid-like pattern of dummy islands in the IC landing area.

7. The prelam body of claim 1, wherein the at least one contact pad and the at least one conductive line is arranged in and/or on the prelam body substrate so as to laterally enclose the at least one dummy island in the IC landing area.

8. The prelam body of claim 1, further comprising an adhesive material sandwiched between the chip and the prelam body substrate, wherein the adhesive material is preferably an anisotropic conductive film or an anisotropic conductive paste or a non-conductive paste.

9. The prelam body of claim 1, wherein the at least one dummy island is formed of an electrically conductive material.

10. The prelam body of claim 9, wherein the at least one dummy island is formed on a layer of insulating material on the first main side.

11. A method of forming a prelam body of a smart card, comprising:
    preparing a prelam body substrate,
    providing an IC landing area on a first main surface of the prelam body substrate, wherein at least one contact pad and at least one dummy island are formed in the first main surface, wherein the at least one contact pad is electrically coupled with at least one conductive line routed in the IC landing area, wherein the at least one dummy island is electrically isolated from any conductive element in the prelam body substrate;
    preparing a chip having at least one contact element arranged on a second main surface of the chip; and
    flip-chip bonding the chip to the prelam body substrate so as to bring the at least one contact element into electric connection with the at least one contact pad, wherein the first main surface and the second main surface face each other, and wherein the chip at least partially overlies the at least one contact pad and the at least one dummy island for supporting the chip on the prelam body substrate.

12. The method of claim 11, wherein a plurality of dummy islands is formed in the IC landing area in an arrangement pattern adjacent the at least one contact pad, and wherein the chip at least partially overlies at least some of the dummy islands.

13. The method of claim 12, wherein the arrangement pattern has a polygonal boundary.

14. The method of claim 12, wherein at least some of the plurality of dummy islands are formed in a columnar shape extending to a height level over the first main surface of the prelam body substantially common to a height level of the at least one contact pad.

15. The method of claim 12, wherein at least some of the plurality of dummy islands are formed in a fin shape extending to a height level over the first main surface of the prelam body substantially common to a height level of the at least one contact pad extends.

16. The method of claim 12, wherein the arrangement pattern is a grid-like pattern of dummy islands in the IC landing area.

17. The method of claim 11, wherein the at least one contact pad and the at least one conductive line is arranged in and/or on the prelam body substrate so as to laterally enclose the at least one dummy island in the IC landing area.

18. The method of claim 11, further comprising providing an adhesive material between the bare die and the prelam body substrate during the flip-chip bonding, wherein the adhesive material is preferably an anisotropic conductive film or an anisotropic conductive paste or a non-conductive paste.

19. The method of claim 11, wherein the at least one dummy island is formed of an electrically conductive material.

20. The method of claim 19, wherein the at least one dummy island is formed on a layer of insulating material on the first main side.

21. A smart card, comprising:
   a card body having the prelam body in accordance with claim 1; and
   an electric module integrated into the card body,
   wherein the electric module is electrically coupled to the at least one contact pad.

22. The smart card of claim 21, wherein the electric module is an antenna coil.

\* \* \* \* \*